US009046613B2

(12) United States Patent
Ramsden et al.

(10) Patent No.: US 9,046,613 B2
(45) Date of Patent: Jun. 2, 2015

(54) RADIATION DETECTOR

(75) Inventors: David Ramsden, Southampton (GB);
Calvin Giles, Southampton (GB)

(73) Assignee: Symetrica Limited, Southampton (GB)

( * ) Notice: Subject to any disclaimer, the term of this patent is extended or adjusted under 35 U.S.C. 154(b) by 172 days.

(21) Appl. No.: 13/810,442

(22) PCT Filed: Jun. 30, 2011

(86) PCT No.: PCT/GB2011/051236
§ 371 (c)(1),
(2), (4) Date: Feb. 25, 2013

(87) PCT Pub. No.: WO2012/007734
PCT Pub. Date: Jan. 19, 2012

(65) Prior Publication Data
US 2013/0146775 A1  Jun. 13, 2013

(30) Foreign Application Priority Data

Jul. 16, 2010 (GB) .................................. 1011986.5

(51) Int. Cl.
*G01T 3/06* (2006.01)
*G01T 1/203* (2006.01)
(52) U.S. Cl.
CPC .. *G01T 3/06* (2013.01); *G01T 1/203* (2013.01)
(58) Field of Classification Search
CPC ......................................................... G01T 3/06
USPC ..................................... 250/390.11
See application file for complete search history.

(56) References Cited

U.S. PATENT DOCUMENTS 4,580,057 A * 4/1986 Sidhwa .......................... 250/392
6,479,829 B1 11/2002 Katagiri
(Continued)

FOREIGN PATENT DOCUMENTS

WO 2004/109331 12/2004
WO 2005/116691 12/2005
(Continued)

OTHER PUBLICATIONS

John C. Barton, Christopher J. Hatton, and John E. McMillan, "A novel neutron multiplicity detector using lithium fluoride and zinc sulphide scintillator." J. Phys. G: Nucl. Part. Phys. vol. 17 No. 12 (Dec. 1991) pp. 1885-1899 <doi:10.1088/0954-3899/17/12/010>.*
(Continued)

*Primary Examiner* — Constantine Hannaher
(74) *Attorney, Agent, or Firm* — Fitzsimmons IP Law

(57) ABSTRACT

A radiation detector for neutrons and gamma-rays includes a conversion screen comprising a mixture of a neutron absorbing material, e.g., containing $^6$Li, and a phosphorescent material, e.g., ZnS(Ag) and a wavelength-shifting light-guide arranged to receive photons emitted from the phosphorescent material and generate wavelength-shifted photons therefrom. The wavelength-shifting light-guide is doped so as to form a gamma-ray scintillator material operable to generate scintillation photons in response to a gamma-ray detection event therein. A photodetector is optically coupled to the wavelength-shifting light-guide and arranged to detect the wavelength-shifted photons and the scintillation photons. Signals from the photodetector are processed to distinguish neutron detection events from gamma-ray detection events.

15 Claims, 4 Drawing Sheets

(56) References Cited

U.S. PATENT DOCUMENTS

| | | |
|---|---|---|
| 7,372,040 B2 | 5/2008 | Polichar et al. |
| 2003/0160178 A1 | 8/2003 | Katagiri |
| 2005/0045827 A1 | 3/2005 | Katagiri et al. |
| 2005/0224719 A1 | 10/2005 | Polichar et al. |
| 2009/0140150 A1 | 6/2009 | Ivan et al. |
| 2009/0166549 A1 | 7/2009 | Czirr |

FOREIGN PATENT DOCUMENTS

| | | |
|---|---|---|
| WO | 2007/132139 | 11/2007 |
| WO | 2010/099331 | 9/2010 |
| WO | WO 2011087861 A2 * | 7/2011 |

OTHER PUBLICATIONS

Barton J C et al.; "A Novel Neutron Multiplicity Detector Using Lithium Fluoride and Zinc Sulphide Scintillator"; Journal of Physics G: Nuclear and Particle Physics; Dec. 1, 1991; pp. 1885-1899; vol. 17, No. 12, Institute of Physics Publishing; Bristol, GB.

A.P. Belian et al.; "Prototype Neutron-Capture Counter for Fast-Coincidence Assay of Plutonium in Residues"; 23rd Esarda Annual Meeting, Symposium on www.osti.gov/scitech/biblio/975031-8dWBfa LA-UR-01-2164, Safegards and Nuclear Material Management, Bruges (Brugge), Belgium, May 8-10, 2001; Los Alamos, National Laboratory; pp. 1-7.

Glenn F. Knoll; "Radiation Detection and Measurement 3rd Edition"; Library of Congress Cataloging-In-Publication Data; Published by John Wiley & Sons, Inc.; 2000, p. 235.

E.S. Kuzmin et al.; "Detector for the FSD Fourier-Diffractometer Based on ZnS(Ag)/6LiF Scintillation Screen and Wavelength Shifting Fibers Readout"; Journal of Neutron Research, vol. 10 (Jan. 1, 2002) Issue I pp. 31-41 <doi:10.1080/10238160290027748>.

* cited by examiner

RADIATION DETECTOR

BACKGROUND ART

The invention relates to radiation detectors and methods for detecting radiation. In particular the invention relates to the detection of neutrons in the presence of gamma-rays.

Neutrons are commonly detected using high pressure proportional counters based on He-3 and relying on the $^3\text{He}_2 + {}^1\text{n}_0 \rightarrow {}^3\text{H}_1 + {}^1\text{p}_1 + 0.764$ MeV reaction. Helum-3 is used because it provides good detection efficiency for thermal neutrons, having a relatively high neutron absorption cross-section (5330 barns). These slow-moving, heavily-ionizing fragments generate a high level of ionization along their tracks in the gas compared with electrons that might be produced as a consequence of gamma-ray interactions in the detector. As a consequence, He-3-based detectors can provide relatively good levels of discrimination against gamma-radiation, except at high count-rates when pulse pile-up reduces the amplitude differences between the ionization produced by the relatively heavy neutron interaction fragments compared with that produced by gamma-ray induced photo-electrons.

Neutron detectors based on the use of cylindrical, high pressure He-3 are manufactured in a wide range of sizes. For example LND, Inc. of New York USA manufacture detectors having diameters that range from approximately 10 mm to 50 mm and lengths from 60 to 2000 mm. These can provide a sensitivity of up to 1700 cps per nv.

However, a problem with He-3-based detectors is that He-3 is in relatively short supply, and is becoming ever more expensive. There is therefore a desire for neutron detectors based on different technologies to allow for the wider use of such detectors. For example, one area where neutron detection is a valuable tool is policing the trafficking of special nuclear materials, e.g. at border crossings. Neutron detectors can be used, for example, to scan cargoes to look for neutron emission associated with the illicit transport of highly enriched uranium, or plutonium, for example.

Some known alternative approaches to neutron detection rely on reactions in Boron, Lithium and Gadolinium.

Boron

The most commonly used reaction for the conversion of slow neutrons into detectable charged particles using oron involves the $^{10}\text{B}_5$ nucleus ($^{10}\text{B}_5 + {}^1\text{n}_0 \rightarrow {}^7\text{Li}_3 + {}^4\alpha_2 + 2.78$ MeV). This reaction is frequently employed in high-pressure $BF_3$ proportional counters. Alternatively, a gas better suited for use in a proportional counter can be used if the $^{10}\text{B}_5$ is thinly deposited on the inner wall of the proportional counter so that the alpha-particles ($^4\alpha_2$) can then escape and ionize the gas.

Boron-loaded scintillators have been made by combining $B_2O_2$ with ZnS. Boron-loaded plastic scintillators are also available. In these the plastic material has a boron content of around 5%. However, the light yield is roughly 75% that of normal plastic scintillators.

Lithium

Slow neutrons interact in the $^6\text{Li}_3$ nucleus to produce a triton and an alpha particle. For this reaction the Q-value is 4.78 MeV (i.e. $^6\text{Li}_3 + {}^1\text{n}_0 \rightarrow {}^3\text{H}_1 + {}^4\alpha_2 + 4.78$ MeV). Since there are no gaseous lithium compounds readily suitable for use in proportional counters, practical Lithium-based neutron detectors have largely been based on scintillation counter designs. Some examples of such detectors include:

(i) Lithium Iodide Scintillation Crystals

A Europium-doped lithium iodide crystal has a scintillation efficiency that is roughly 30% that of sodium iodide. A detector having a thickness of a few millimeters provides an efficient detector for thermal neutrons.

(ii) Lithium Fluoride Loaded Zinc Sulphide with Silver/Copper Activation.

The reaction fragments from $^6\text{Li}_3 + {}^1\text{n}_0$ events interact with the ZnS scintillator to generate scintillation light photons which is detected by a photodetector. For applications in which that scintillation light is detected by a photo-multiplier tube, the ZnS is commonly doped with silver to help match the emission spectrum to the peak response of typical photo-multiplier tubes. For applications in which that scintillation light is detected by detectors having peak responses more towards the red (e.g. CCD photodetectors), the ZnS is commonly doped with copper to shift the emission spectrum to better match the response of the photodetector.

(iii) Lithium Glass Scintillators

The lithium content of some special glasses is sufficient to provide for efficient detection of thermal neutrons within a thickness of a few millimeters. However, the scintillation efficiency for lithium glass is not as high as for lithium iodide scintillator crystals.

Gadolinium

This element has a very high neutron absorption cross section (34,000 barns) such that only thin foils of gadolinium are needed to detect thermal neutrons. Some neutron detectors have been constructed by placing gadolinium foil in close proximity to a silicon detector.

Although there are a range of alternative-technologies for neutron detection available, none of these can be readily be implemented in, for example, relatively large scale and low cost detectors suitable for use for scanning for special nuclear materials, such as at border crossings.

Furthermore, there is often a need for neutron detectors to be able to operate against a significant gamma-ray background, e.g. because a smuggler may often try to mask an illicit neutron source with a legitimate gamma-ray source.

US 2009/0140150 [1] discloses an integrated neutron and gamma-ray radiation detector which distinguishes between neutron and gamma-ray detection events based on optical pulse shape processing.

U.S. Pat. No. 7,372,040 [2] discloses a broad spectrum neutron detector based on an interleaved stack of thermal neutron sensitive scintillator films and hydrogenous thermalising media. However, the detector of U.S. Pat. No. 7,372,040 [2] is designed to have negligible sensitivity to gamma-rays, which precludes its use in monitoring incident gamma-ray flux.

There is therefore a need for neutron detection schemes that may more readily be used in situations requiring relatively large scale and low cost detectors and furthermore which are capable of providing a constant neutron-detection sensitivity even when subjected to high gamma-ray dose rates.

SUMMARY OF THE INVENTION

According to a first aspect of the invention there is provided a radiation detector comprising: a conversion screen comprising a mixture of a neutron absorbing material and a phosphor (luminescent) material, a wavelength-shifting light-guide arranged to receive photons emitted from the phosphor material and generate wavelength-shifted photons therefrom, wherein the wavelength-shifting light-guide comprises a sheet of gamma-ray scintillator material operable to generate scintillation photons in response to a gamma-ray detection event therein, wherein the conversion screen and wavelength-shifting light-guide comprise different layers, and a photodetector optically coupled to the wavelength-shifting light-guide and arranged to detect the wavelength-shifted photons and the scintillation photons.

Thus a single detector responsive to both gamma-rays and neutrons in provided.

The conversion screen may comprises a substrate with the neutron absorbing material and the phosphor material being in powdered form in a binding material on the substrate. The substrate may be reflective for wavelengths in the region of the peak emission wavelength of the phosphor material to help to increase the number of photons emitted from the phosphor material coupled into the wavelength-shifting light-guide.

The radiation detector may comprise a second conversion screen disposed on an opposing side of the wavelength-shifting light-guide to the first-mentioned conversion screen such that the wavelength-shifting light-guide is arranged to also receive photons emitted from the second conversion screen as well as from the first-mentioned conversion screen, and to create wavelength-shifted photons therefrom.

The wavelength-shifting light-guide may comprise a sheet (plank) of a plastic scintillator material.

The radiation detector may further comprise a layer of neutron moderating material arranged to moderate neutrons prior to interaction in the conversion screen. This can help in detecting incident neutrons more efficiently.

The conversion screen and wavelength-shifting light-guide may be in the form of adjacent planar layers which may be arranged in loose (non-bonded) contact.

The conversion screen and/or the wavelength-shifting light-guide may have a length selected from the group comprising at least 0.1 m, at least 0.5 m, at least 1 m, at least 1.5 m, and at least 2.0 m. The conversion screen and/or the wavelength-shifting light-guide may have an extent in a first direction that is greater thin its extent in two orthogonal directions by a factor selected from the group comprising at least 5, 6, 7, 8, 9 and 10 times.

The photodetector may comprise a wideband amplifier, e.g., perhaps having a bandwidth on the order of/around 50 to 100 Mhz.

The radiation detector may further comprise a processor arranged to receive a signal output from the photodetector and to process the signal to determine whether a radiation interaction has occurred in the detector.

The processor may be operable to identify the occurrence of spikes (which may be peaks or troughs) in the signal by identifying changes in the signal larger than a spike threshold. The processor may be further operable to determine the number of spikes occurring in a time interval.

The processor may also be operable to compare the number of spikes occurring in a time interval with a threshold number, and to determine whether the spikes are associated with one or more gamma-ray interactions in the wavelength-shifting light-guide or one or more neutron interactions in the conversion screen based on the result of the comparison. For example, if the number of spikes in the time interval is less than the threshold number, the spikes may be determined to be associated with gamma-ray interactions in the wavelength-shifting light-guide, and if the number of spikes in the time interval is more than the threshold number, the spikes may be determined to be associated with a neutron interaction in the conversion screen.

The threshold number and/or the duration of the time interval may be dependent on a number of gamma-ray interactions determined to have occurred in at least one previous time interval. For example, the threshold number and/or the duration of the time interval may depend on a determined average number of gamma-ray interactions determined to have occurred in a number of previous time intervals.

The functional form of the dependence of the threshold number and/or the duration of the time interval on the number of gamma-ray interactions in the previous time intervals may be determined through a calibration exercise. For example, the functional form may follow a non-linear fit to results of a calibration exercise The processor may be further operable to provide an output signal indicative of the nature of radiation interactions determined to have occurred in the detector.

According to a second aspect of the invention there is provided a method of detecting radiation comprising: providing a conversion screen comprising a mixture of a neutron absorbing material and a phosphor material, providing a wavelength-shifting light-guide arranged to receive photons emitted from the phosphor material and generate wavelength-shifted photons therefrom, wherein the wavelength-shifting light-guide comprises a sheet of gamma-ray scintillator material operable to generate scintillation photons in response to a gamma-ray detection event therein, wherein the conversion screen and wavelength-shifting light-guide comprise different layers, and detecting photons corresponding to the wavelength-shifted photons and/or the scintillation photons.

BRIEF DESCRIPTION OF THE DRAWINGS

For a better understanding of the invention and to show how the same may be carried into effect reference is now made by way of example to the accompanying drawings in which.

DETAILED DESCRIPTION

Figures 1A, 1B:
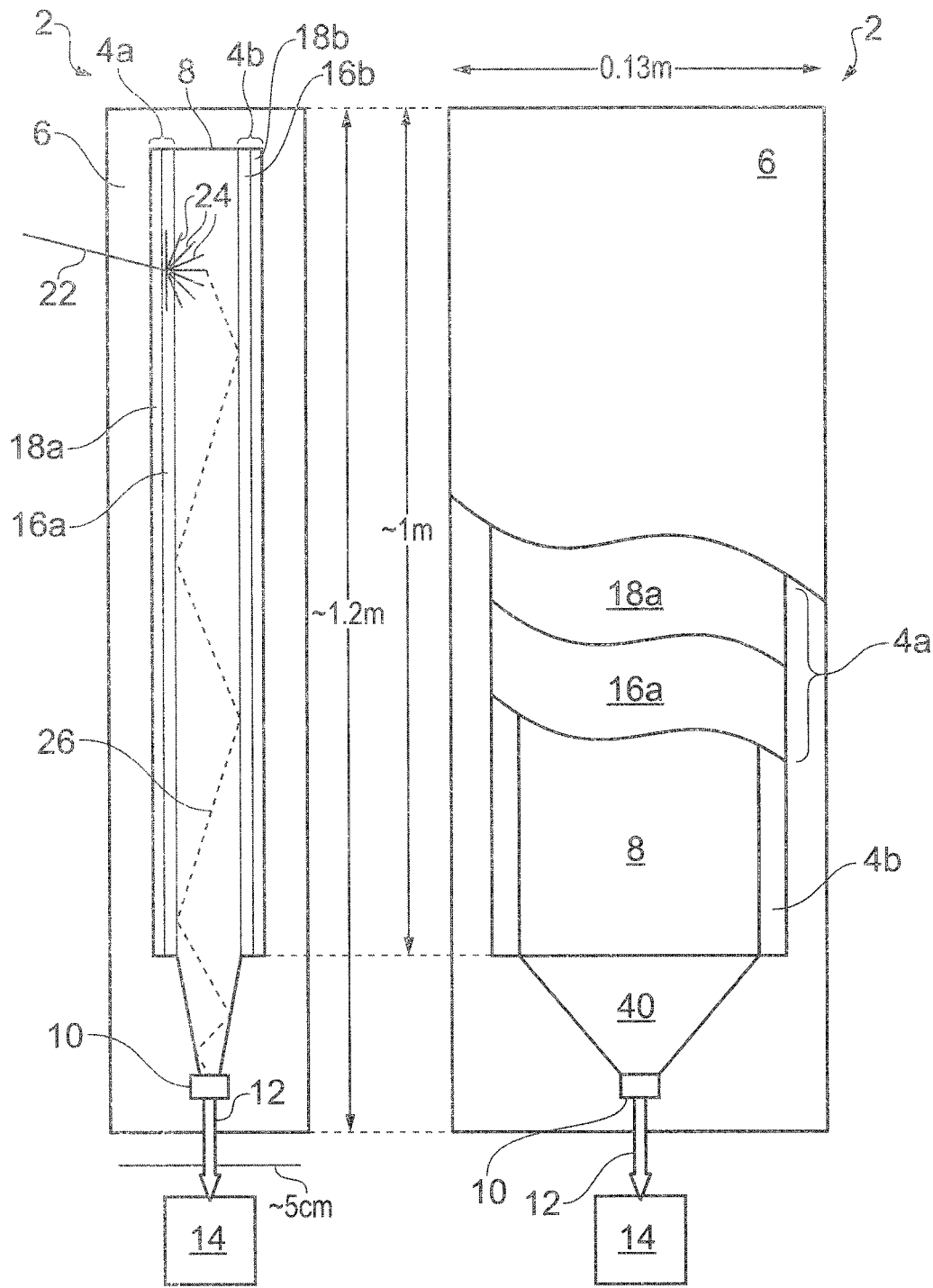
FIGS. 1A to 1C schematically show respective side, plan and perspective views of a radiation detector according to an embodiment of the invention.
Figure 1C:
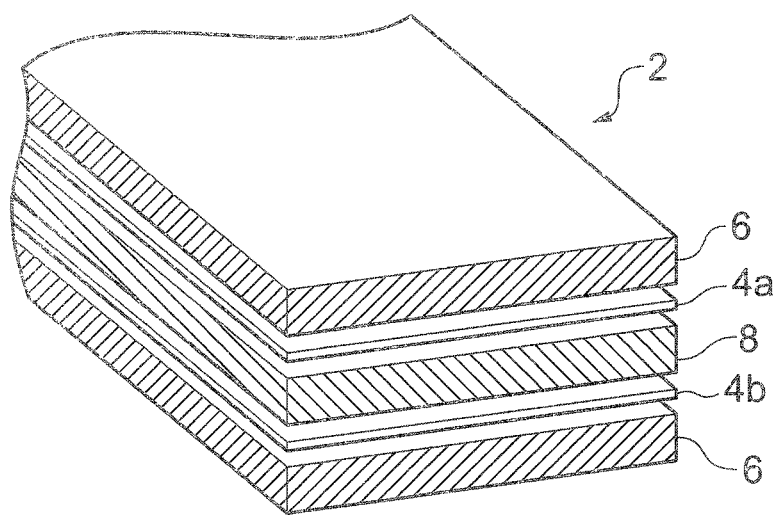

FIGS. 1A, 1B and 1C schematically show a neutron detector 2 according to an embodiment of the invention in respective side, face and perspective views. The neutron detector 2 has a generally layered structure and is shown in FIGS. 1B and 1C in partial cut-away to reveal features of the different layers. The face view of FIG. 1B is from the left-hand side of the detector as shown in FIG. 1A, although this is not overly significant since in this example embodiment the detector is in any case symmetric about the plane of the drawing of FIG. 1B. Various layers of the detector 2 and schematically shown separated form one another in FIG. 1C for ease of representation. In practice the different layers will be directly adjacent one another.

The neutron detector comprises a pair of neutron absorbing conversion screens 4a, 4b arranged on either side of a wavelength-shifting light-guide 8 in the form of a plastic scintillator plank. The light-guide 8 is coupled to a photodetector 10, e.g. a silicon photomultiplier detector, via a conventional optical coupler 40, e.g. a fish-tail light guide. These elements of the detector are mounted in an optically opaque neutron moderating cover 6, e.g. comprising HDPE (high density polyethylene).

Output signals from the photodetector 10 (schematically shown by arrows 12) are passed to a processor 14 for processing. The processor may be internal to the main detector body, or may be external.

The characteristic scale of the detector is schematically shown in the figures (although it will be appreciated that some aspects of the figures are not drawn to scale). Thus in this example, the detector 2 is generally plank-like with an overall length of around 1.2 m, a width of around 13 cm, and a thickness of around 0.05 m. The conversion screens (defining the neutron-sensitive active area) have lengths in this example of around 1 m, widths of around 10 cm, and thicknesses of less than 2 mm or 3 mm or so, for example, less than 1 mm. The light-guide has an area broadly corresponding that of the adjacent conversion screens. The thickness of the light-guide depends on the technology employed. For example, a light-guide based on a single slab of wavelength-shifting material as in this example might have a thickness of a few cm, e.g. perhaps in the region 1 to 5 cm, for example around 2 cm or higher, 2.5 cm or higher or 3 cm or higher. In other examples different characteristic scales of detector may be appropriate. For example, an areal detector size on the order of 200 cm×10 cm could be used for a monitoring in a portal application, a size of perhaps 40 cm×30 cm could be used for a portable "back-pack" detector, and perhaps a size of 10 cm×10 cm or smaller could be used for a user wearable detector.

In this example embodiment the conversion screens 4 each comprise a conversion layer 16a, 16b comprising a mixture of a neutron absorbing material and a phosphorescent material mounted on a substrate 18a, 18b. Each substrate here is an aluminium sheet with a reflective face on the side of its respective conversion layer. The reflective face may be provided by polishing the aluminium or by an intermediate coating, e.g. a diffusively reflecting white coating. The mixture of neutron absorbing material and phosphorescent material comprises powdered forms of each which are well-mixed in a resin binder and spread onto the substrate, e.g. in a layer perhaps around 0.5 to 1 mm thick, and left to set. In this example, the neutron absorbing material comprises $^6$Li enriched LiF. The phosphorescent material comprises ZnS (Ag). In other examples the neutron absorbing material may be based on/include other neutron-absorbing elements, e.g. $^{10}$B. Equally, in other examples the phosphorescent material may be based on/include other phosphorescent material, e.g. using pure CsI or yttrium aluminium perovskite (YAP) in powdered/granular form.

In this example the wavelength-shifting light-guide 8 comprises a plank of wavelength-shifting plastic scintillator material, e.g. based on polyvinyltoluene such as the EJ-280 materials available from Eljen Technology, Texas, USA. The wavelength-shifting light-guide 8 may, for example, broadly follow any of the designs of the plastic scintillators described in EP 1 749 220 [3] or 2 019 974 [4], the contents of which relating to those designs are incorporated herein by reference.

The wavelength-shifting light-guide 8 is placed in loose contact with the conversion screens 4a, 4b so that optical photons from the phosphorescent material in the conversion screens are readily coupled into the wavelength-shifting light-guide 8. The conversion screens in this example are in loose contact and not bonded contact with the wavelength-shifting light-guide 8 such that they do not significantly disrupt total internal reflection processes within the wavelength-shifting light-guide 8.

The role of the conversion layers 16 of the conversion screens 4 is to convert incidents neutrons into light. Thus, and as schematically shown in FIG. 1A, a neutron 22 incident on the detector 2 may be absorbed by the neutron absorbing material by interacting with one of the $^6$Li nuclei. This reaction ($^6$Li$_3$+$^1$n$_0$→$^3$H$_1$+$^1$α$_2$+4.78 MeV) results in reaction fragments that readily excite the intermixed phosphorescent ZnS (Ag), causing it to radiate photons 24. These photons may be referred to as neutron interaction photons and follow the emission spectrum of the ZnS(Ag) phosphor, which has a peak at a wavelength of around 450 nm. The neutron interaction photons 24 are emitted in all directions. Since the conversion layer is relatively thin, for most interaction sites the light-guide 8 presents a solid angle of around $2\pi$ such that close to half of the phosphorescence photons 24 from the neutron to interaction that escape the conversion layer enter the light guide directly. Furthermore, there is a high chance that many of the remaining half of phosphorescence photons (i.e. those initially travelling away from the light-guide) will also enter the light-guide 8 following reflection from the associated substrate 18. Thus a relatively large fraction of the neutron-induced phosphorescent photons 24 enter the light-guide 8.

In general, the initial directions of the photons 24 entering the light-guide 8 will be such that the majority of these photons would not be efficiently guided to the photodetector (e.g., because they enter at too steep an angle). However, the wavelength-shifting nature of the light-guide 8 means the phosphorescence photons 24 from the ZnS(Ag) phosphor intermixed with the neutron-absorbing LiF in the conversion screens 4 may be absorbed in the light-guide plank 8 and corresponding longer-wavelength photons re-emitted. Significantly, however, the wave-length shifted photons will be emitted over a broad range of directions such that a higher number will be efficiently guided to the photodetector 10 for detection than would be the case for the phosphorescence photons 24 in a non-wavelength shifting light-guide.

The wavelength shifted photons which are guided along the light guide 8, e.g. by total internal reflection at the surfaces of the light-guide, as schematically shown by dotted line 26, are detected at the photo-multiplier 10, and a corresponding output signal 12 generated in the usual way. The output signals are passed to the processor 14 for processing to determine when neutrons are detected. For example, output signals may be compared with a threshold signal. If an output signal is greater than the threshold, it may thus be assumed that the corresponding energy deposited in the detector in sufficiently high that it is to be assumed that a neutron detection event has occurred. In this way, the number of output signal pulses meeting the threshold detection test in a measurement period provides an indication of the neutron flux to which the detector is exposed during that period. For example, at a border crossing where cargo is passed by the detector, an increased number of output signals meeting the detection threshold as a cargo passes may be treated as an indication that the cargo should be examined further. Further aspects of the processing of signals from the photodetector 10 are described further below.

Thus the detector 2 of FIG. 1 is operable to provide sensitivity to neutrons. However, in using a gamma-ray scintillator material for the wavelength shifting light guide 8, the detector design shown in FIG. 1 is also sensitive to gamma-rays. This is because as well as acting as a wavelength-shifting lightguide for the neutron detection aspect of the detector, the light guide may also comprise the main scintillating detection body of an otherwise conventional large area plastic scintillator, e.g. of the kind pioneered by Symetrica Limited. Examples of such gamma-ray spectrometers are described, for example, in EP 1 749 220 [3] or 2 019 974 [4]. As noted above, the light guide 8 of the detector 2 of FIG. 1 may broadly follow any of the designs of the plastic scintillators described in EP 1 749 220 [3] or 2 019 974 [4].

Thus, and as described further below, the processor 14 of the detector 2 of FIG. 1 is configured to distinguish between events associated with neutron interactions in the conversion screens and gamma-ray interactions in the light guide. Furthermore, the processor may be operable to derive energy loss spectra from the output signals 12 from the photodetector which are not deemed to be associated with neutron interaction events in the conversion screen, for example because the output signals do not exceed a pre-defined threshold, or based on some other selection criterion, e.g. pulse shape considerations. On the assumption that output signal events which are not deemed to be neutron interaction events are associated with gamma-ray interactions in the light guide 8, an energy loss spectrum for these events, e.g. determined in any conventional manner, could provide some information on sources of gamma-rays in the environment of the detector. This is in addition to the neutron detection capability of the detector in accordance with the techniques described above.

Thus embodiments of the invention may be seen in some respects as a conventional large-plastic scintillator based gamma-ray detector to which neutron detection capability has been added through the provision of one or more conversion screens, such as those described above.

Aspects of embodiments of the invention relating to the distinguishing of neutron events from gamma-ray events will now be described.

Gamma-ray scintillation events in the plastic wavelength shifting light guide 8 of the radiation detector of FIG. 1 typically give rise to fast single pulses from the photodetector, typically with durations of less than 20 ns. (Some gamma-ray interactions may also occur in the conversion screens 4 and these give rise to similarly fast photodetector signals.)

Figure 2:
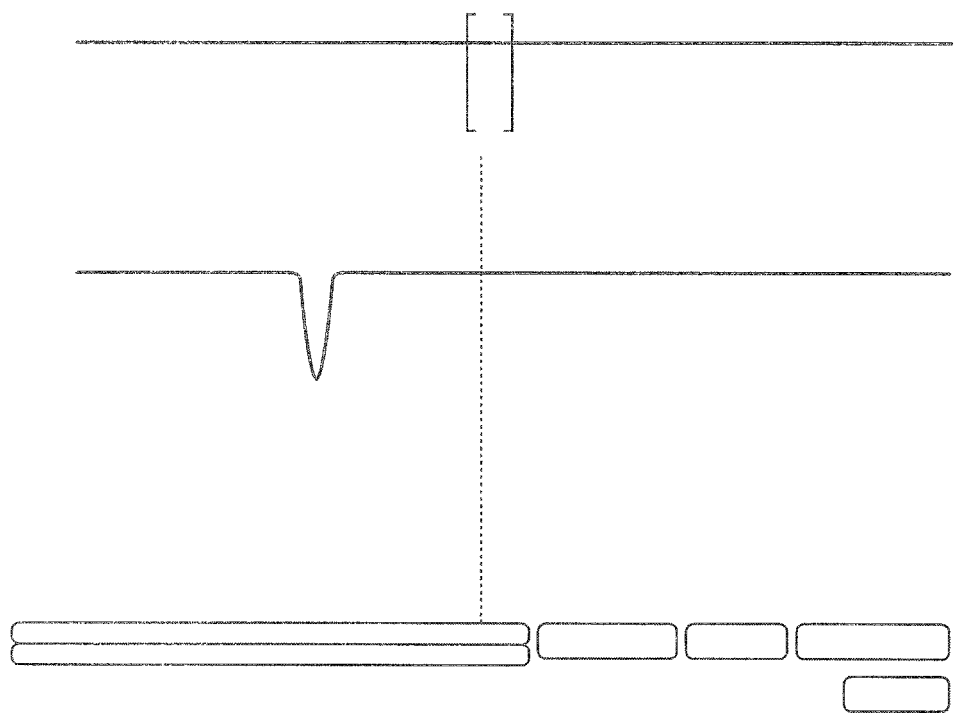
FIG. 2 schematically shows an oscilloscope trace representing an output signal for the radiation detector of FIGS. 1A to 1C seen in response to a gamma-ray detection.

FIG. 2 shows an oscilloscope screen shot representing the output pulse from the photodetector 12 of the radiation detector of FIG. 1 for a single gamma-ray scintillation event in the wavelength shifting light guide. The detection electronics in this example are such that an increase in light intensity at the photodetector results in a negative going pulse. FIG. 2 comprises an upper panel showing the gamma-ray detection event on a first time base and vertical scale and a larger lower panel showing the detection event on a magnified scale (about 20× in time base and 4× in amplitude). Thus the full width at half maximum of the pulse is around 40 ns. The vertical scale is arbitrary and not significant here.

Gamma-ray detection events are relatively consistent in the detection signals they produce. Most gamma-ray detection in the wavelength shifting light guide will produce signals having broadly the same characteristics as seen in FIG. 2, although will typically be of differing amplitudes according primarily to the energy of the deposited in the scintillation event in the light guide.

The photodetector response seen for neutron detection events in the conversion screens 4 of the radiation detector of FIG. 1 is typically different. ZnS(Ag) phosphor, as used in the conversion screens in the example of FIG. 1, is commonly reported to have a principal light decay-time of 200 ns when excited by alpha particles [5].

However, in practice the ZnS(Ag) response to alpha particles is not this simple. For example, some reports indicate the pulse decay-time might differ from between 10 ns for gamma-ray events and 70 ns for neutron events. More recently, Kuzmin et al [6] have demonstrated that light-emission for ZnS(Ag) can continue for perhaps as long as 1 ms after a detection event.

The output response from the radiation detector 2 of FIG. 1 for neutron detection events in the conversion screen is also complicated by what has been found to be a relatively large variation in light-emission efficiency for the screens. This variation may be due to a dependence on both the residual energy that triton and alpha particles have when they emerge from a microcrystal of LiF to interact with the ZnS(Ag) component of the screen, and the depth of the neutron interaction within the screen. These types of effect means that not only is the light output for neutron detection events relatively complex, the extent of complexity between events shows significant degrees of variation. This is demonstrated by FIGS. 3 and 4.

Figure 3:
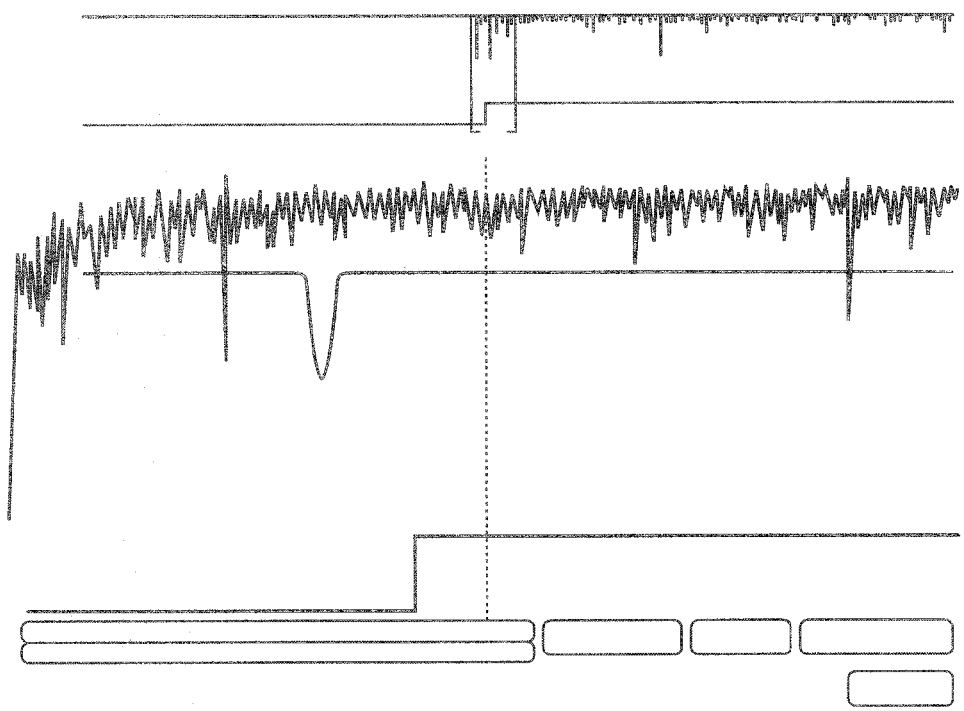
FIG. 3 is schematically shows an oscilloscope trace representing an output signal for the radiation detector of FIGS. 1A to 1C seen in response to a neutron detection event when using a wideband amplifier.
Figure 4:
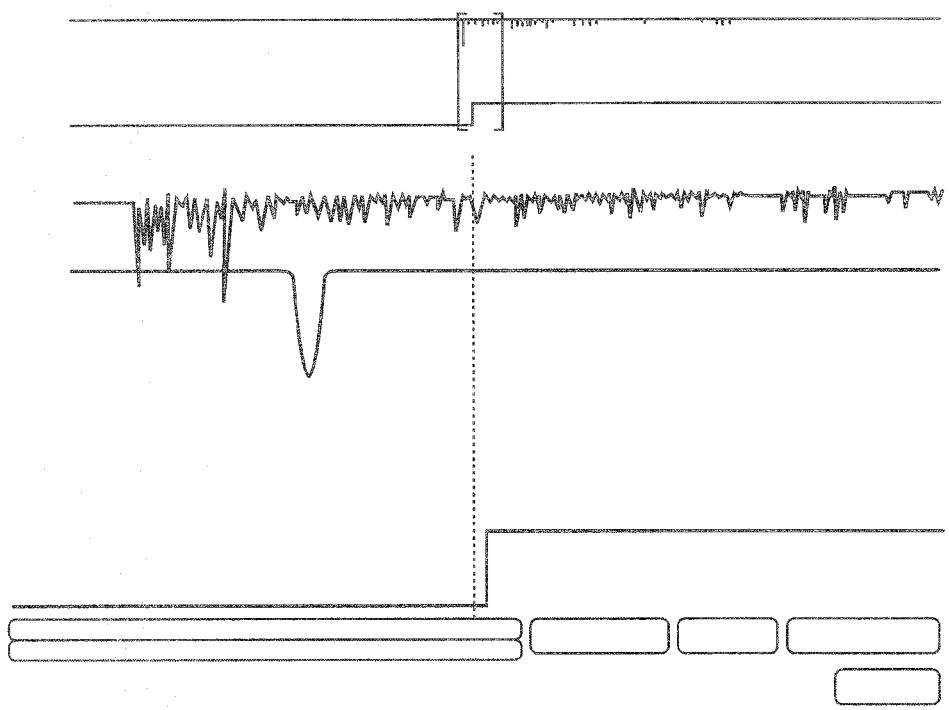
FIG. 4 is similar to FIG. 3 but shows a trace for a different neutron detection event.

FIGS. 3 and 4 respectively show oscilloscope screen shots representing the output from the photodetector 12 of the radiation detector of FIG. 1 for two different neutron detection events. The detection electronics for the photomultiplier 12 comprise a conventional wideband front-end amplifier to allow fine structure in the output signal to be resolved, e.g. detail on a scale of around 30 ns. Each of FIGS. 3 and 4 comprises an upper panel showing their respective neutron detection events on a first time base and vertical scale and a larger lower panel showing the detection event on a magnified scale (about 20× in time base and 4× in amplitude). The full widths of the traces for the lower panels is around 20 µs The vertical scale is arbitrary but consistent between the two figures.

As can clearly be seen from FIGS. 3 and 4, very different and complex response characteristics can be seen for neutron detection events when using sufficiently fast detection electronics.

As a consequence of the typical response behaviour for both gamma-ray and neutron detection events, the inventors have found it is often not possible to reliably identify neutron events against the presence of a high flux of gamma-rays, for example, from $^{60}$Co, simply by integrating the light signal. This is especially so for large area detectors. For example, a detector with an areal size on the order of 100 cm×10 cm will receive perhaps $10^7$ to $10^8$ gammas-rays per second for a dose-rate of around 10 mR/hr. This can easily swamp neutron detection events occurring at lower count rates which makes them hard to identify amongst so many gamma-ray events using normal analogue pulse-shaping methods.

To address these issues the inventors have developed a discrimination technique that has been found to be well suited for use with gamma-ray spectrometer designs in accordance with embodiments of the invention. The discrimination technique is based, for example, on an analysis of signals obtained from the photodetector 10, which in this case is a conventional photomultiplier. The signals are pre-processed using a conventional wideband (fast) amplifier (e.g. around 50-100 MHz) and filter circuitry to provide signals similar to those shown in FIGS. 3 and 4. This is followed by a conventional discriminator and fast-counting system. This can be implemented using, for example, an FPGA or micro-controller. This circuit approach is quite different to a conventional approach based on an assumed scintillation decay time of 200 ns. For example, there may be no use of conventional scintillation-counter pre-amplifier and pulse-shaping electronics.

Thus a wideband front-end amplifier for the photodetector is used which is able to respond both to the very fast individual gamma-ray signals (i.e. signals associated with gamma-ray scintillation events in the scintillating light-guide 8 of FIGS. 1A to 1C), and to resolve the sub-structure in the neutron induced signals. As can be seen from FIGS. 3 and 4, a neutron event is typically characterised by an intense train of pulses which decay in both amplitude and frequency, e.g. over time periods of up to 1 ms and beyond. However, since the neutron interactions occur at different depths in the conversion screens, the characteristics of the bursts can be very variable. The gamma-ray signals, on the other hand, are typically characterised by a single fast pulse in the output signal from the photodetector, such as seen in FIG. 2. Gamma-ray signals for different events vary in amplitude, primarily according to the energy of the incident gamma-ray, but also in dependence on geometric effects, e.g. based on where in the wavelength shifting light-guide the interaction occurred. In this regard, it can be difficult to distinguish single gamma-ray interaction events from individual features in the more complex neutron interaction events.

Figure 5:
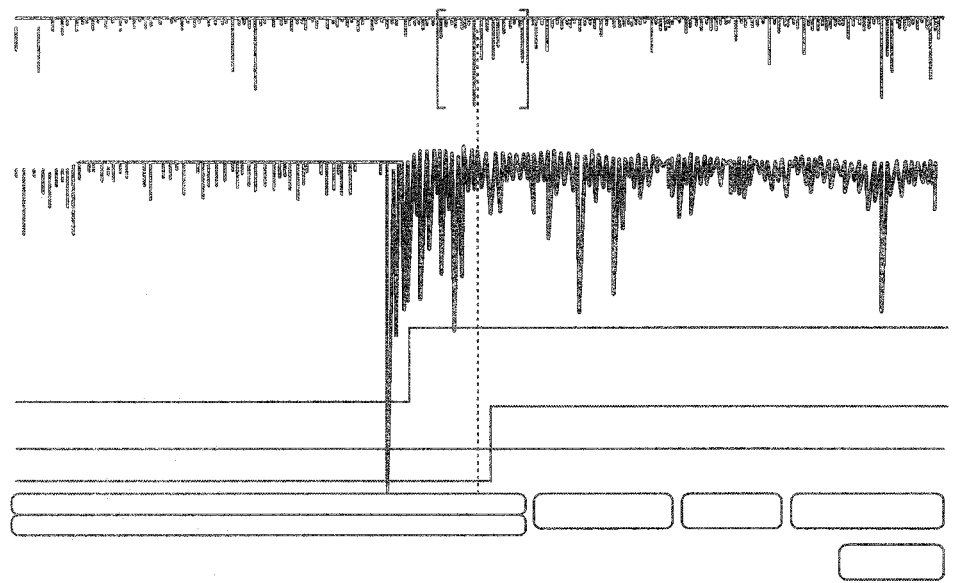
FIG. 5 is similar to FIGS. 3 and 4 but shows a trace a different neutron detection event against a background of gamma-ray detection events.

FIG. 5 shows an oscilloscope trace which is similar to and will be understood from those of FIGS. 3 and 4. However, whereas FIGS. 3 and 4 represent different responses for neutron interaction events in isolation, FIG. 5 shows a neutron interaction event occurring against a significant gamma-ray background flux.

For the upper traces in each of FIGS. 3 to 5 the signals associated with the respective neutron events begin around halfway along the trace. In both FIGS. 3 and 4 (no gamma-ray background) the respective traces for the time before the neutron interaction is "quiet". This means neutron events could be easily identified in these circumstances using basic techniques, for example, by looking for a train of pulses occurring above a predefined threshold signal level which can be set relatively low. However, for FIG. 5 (with gamma-ray background) the trace before the neutron interaction contains many peaks associated with gamma-ray interactions in the wavelength shifting light-guide. This complicates the process of identifying the occurrence of the neutron interaction event. For the example shown in FIG. 5, the neutron interaction event is still relatively apparent from the number of strong peaks occurring in the short period immediately after the event starts, even though the later structure is lost against the gamma-ray background. However, the variation in neutron signals discussed above means other events can be harder to identify. For example, the event represented in FIG. 4 would be much harder to see against a high gamma-ray background than the event of FIG. 3.

In seeking to address this issue, the Inventors have explored various signal-processing criteria to identify a neutron pulse reliably in the presence of a large flux of gamma-rays.

One approach is to identify peaks in the signal, e.g. using conventional signal processing techniques to determine the number of events exceeding a predefined threshold, and to count the number of peaks occurring in successive time intervals, for example in intervals of a few microseconds or so. (It will be appreciated that "exceeding" a threshold is intended here with reference to the magnitude of the signals, so that for negative going pulses, the threshold is "exceeded" if the signal falls below a predefined signal level.) Conventional pulse counting techniques may be used, e.g. using a simple comparator for comparing the output from the photodetector (post amplification and filtering) with a trigger threshold level. An appropriate trigger threshold level may be selected through calibration. For example by being set high enough to ensure there are zero (or very few) pulses counted when the is no gamma or neutron source nearby, while being set low enough to ensure an appropriate number of pulses are counted when a calibration source is nearby. The comparator output may be coupled to a digital counter which increments for each "up-down toggle" of the output to count pulses. The counter value may then be read at fixed time intervals to show the number of pulses detected in the most recent time interval. The number of identified peaks in the time interval may then be compared with a threshold number of peaks for the time interval. This threshold number may be referred to as a "digital" or "pulse count" threshold P for the number of peaks. If the pulse count for a given time period exceeds the pulse count threshold P it is assumed a neutron detection even has occurred. A consecutive number of time intervals for which the pulse count threshold P is exceeded may be considered as being associated with a single event.

However, using this approach of counting peaks in successive time intervals has highlighted some of the issues associated the wide variations that exist in the characteristics of individual neutron signals. For example, the number of neutron events identified per unit time with this approach is found to depended quite strongly on the selected threshold signal for identifying a peak.

The inventors have recognized that under typical conditions the initial pulse rate (pulse per time interval) at the start of a neutron event for a detector of the kind shown in FIG. 1 is typically the highest during that event and the first 5 µs might typically contain 25 or more pulses. However, there is a broad range in this and the number of peaks in a 5 µs period might range from say 8 to around 100, for example. The selection of the specific digital 'threshold' P (i.e. the minimum number of pulses counted in a time interval that is taken to indicate a neutron event) impacts on the neutron detection efficiency and the ability to suppress the effects of gamma-ray background.

The inventors have found that under typical conditions for a detector of the form shown in FIG. 1 a choice of a pulse count threshold of 25 pulses per 5 µs provides an ability to detect neutrons reasonably efficiently in the presence of gamma-ray dose-rates of perhaps up to 300 µSv/hr. When combined with a gamma correction term to the pulse count threshold (discussed further below), this can provide reasonably reliable discrimination against gamma-ray induced pulse rates of 15 events in 5 µs, for example.

During use an average background gamma-ray pulse-rate may be determined by monitoring the number of pulses occurring during successive 5 µs intervals which are deemed not to relate to a neutron event (because the pulse count rate is below the pulse count threshold P). The data may thus be used to derive a value for the average number of gamma-rays/5 µs (g). The inventors have found more reliable results may be obtained if the pulse count threshold P is modified as a function of this value g for the average number of gamma-rays per 5 µs period. The correction function $f(g)$ may be determined experimentally by measuring changes in the determined neutron detection rate seen for a known neutron flux for different known background gamma-ray dose-rates.

To perform the calibration according to some example, the detector may be placed in a high-neutron-flux, low-gamma-flux environment, and the neutron detection rate measured. The gamma flux incident on the detector may then be increased (e.g. by moving a gamma-ray source closer to the detector), and the digital threshold may then be raised until the detected count rate matches the benchmark rate observed at low gamma flux. The gamma rate may be measured internally and this internal gamma measurement is associated with the correction to the threshold required. This can repeated for different strengths of gamma flux to build up sufficient data points to fit a function, namely f(g).

Thus a function f(g) may be derived which has been helpful in improving the constancy of neutron detection efficiency against varying gamma-ray backgrounds. For example, in order to maintain a relatively constant neutron sensitivity with against a changing gamma-ray background, one might set the digital pulse count threshold P for each time period according to the following criterion;

$$\text{digital threshold } P = 25 + f(g)$$

where g is a running average of the gamma-ray count rate for a preceding period, e.g., a preceding period of tens of milliseconds, or perhaps longer, e.g., on the order of a few seconds. The averaging time for g may be selected according to the expected rate of change in background gamma-ray flux.

It will be appreciated that instead of modifying the pulse count threshold P in dependence on the average gamma-ray flux, an alternative approach would be to keep the pulse count threshold P fixed, but modify the duration of the time period over which pulses are counted.

This discrimination approach has been tested and found to work well up to gamma-ray dose-rates of at least 300 µSv/hr in a detector having a sensitive area of 0.1 m$^2$. The on-going measured value of g has been found to provide a good indicator of gamma-ray flux at the detector that can be used to continuously or periodically adapt the pulse count threshold P.

Two techniques for applying this adaptive threshold have been used by the inventors. In one approach the timing intervals are unrelated to the times of arrival of neutron signals. In this method the digital threshold P may not be exceeded until the neutron signal spans the second of the 5 µs timing intervals. In the second approach, use is made of the fact the initial pulse in the train of pulses generated by a neutron is normally larger than any of the gamma-ray signals. In this way, the digital threshold can be set from the point of the onset of the neutron event. The decision regarding whether to operate in this triggered or the alternative, repetitive method can be selected on the basis of the characteristics of the particular detector design.

While FIGS. 1A to 1C show a relatively large radiation detector in generally planar form, other shapes and sizes of radiation detector may be provided in accordance with embodiments of the invention.

Figure 6:
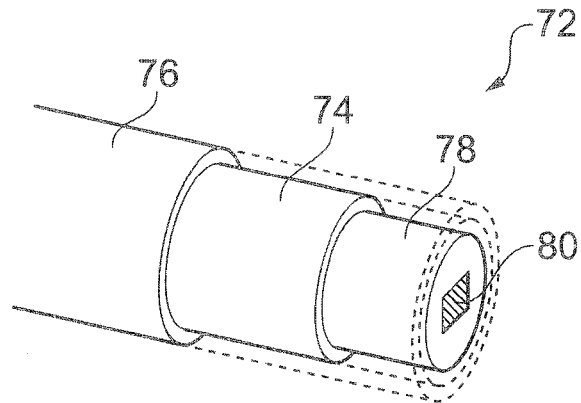
FIG. 6 schematically shows a perspective partial cut-away view of a radiation detector according to another embodiment of the invention.

FIG. 6 schematically shows in partial cut-away some components a radiation detector 72 having broadly similar functionality to that described above with reference to FIGS. 1A to 1C, although in a different geometry, namely a generally circular cylindrical geometry.

Thus the radiation detector 72 comprises a circular cylindrical wavelength shifting light guide 78 coupled to a silicon photomultiplier photodetector 80. Although not shown in FIG. 6 for simplicity, the photodetector 80 is coupled to detection electronics and processing circuitry similar to that described above for the generally planar detector of FIGS. 1A to 1C. An annular conversion screen 74 surrounds, and is in loose contact with, the wavelength shifting light guide 78. An outer aluminium housing 76 surrounds the other components shown in FIG. 6. Although the detector is schematically shown in FIG. 6 with sections of the inner components exposed, this is merely for representation. In practice the conversion screen 74 may fully surround the axial extent of the wavelength shifting light guide 78, and likewise the outer aluminium housing 76 may fully surround the axial extent of the annular conversion screen 74 (and indeed the end faces of the detector).

The wavelength shifting light guide 78 may be formed of the same material as the wavelength shifting light guide 8 of FIGS. 1A to 1C discussed above. Similarly, the conversion screen 74 may be formed of the same materials as the conversion screens 4 described above. In a variation, instead of a rigid annular cylindrical aluminium substrate for the annular conversion screen 74, a flexible substrate may be used (e.g. thin aluminium or other material) which may be simply wrapped around the wavelength shifting light guide 78 during assembly.

The operating principles for the radiation detector 72 of FIG. 6 are similar to, and will be understood from, the above description of the radiation detector 2 of FIG. 1. For example, signal processing techniques similar to those described above may also be used for the detector of FIG. 6. The only significant difference between the radiation detectors of FIGS. 1 and 6 is in their geometry. The generally cylindrical geometry of FIG. 6 may be used, for example, in a hand held device. For example, the radiation detector may have a characteristic size of around 10 cm in length and around 3 or 4 cm in diameter so that it might be incorporated into the handle of a device. In such an arrangement a user's hand holding the device may therefore provide for additional neutron moderation thereby increasing the likelihood of neutron interaction in the conversion screen.

Other shapes and sizes of radiation detectors operating according to the same general principles as those set out above may also be used. For example, a "back-pack" size detector may be provided.

Figure 7:
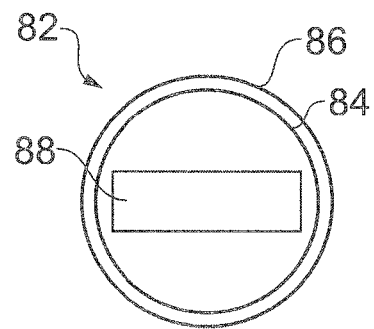
FIG. 7 schematically shows an end view of a radiation detector according to still another embodiment of the invention

FIG. 7 schematically shows an end view of a radiation detector 82 having another geometric another design but otherwise having broadly similar functionality to that described above with reference to the detectors shown in FIGS. 1A to 1C and FIG. 6. In this case, the geometry has been optimised so that the detector could be especially appropriate for neutron-scattering application. For this use it can be helpful for there to be minimal scattering before detection since event-timing can be of significance. In the detector 82 of FIG. 7 a cylindrical outer structural housing 86 supports a conversion screen 84 on its inner surface. A wavelength shifting light guide 88 of generally rectangular cross section is mounted inside the conversion screen 84 and housing 86. This design differs from the of FIG. 6 primarily in that the substantial part of the outer surface of the wavelength shifting light guide 88 is not in contact with other parts of the detector. This can be advantageous in some situations since it reduces the extent to which total internal reflection of photons in the light guide is disrupted, thereby increasing the overall efficiency of light collection.

It will be appreciated that features of the above described embodiments may be combined as appropriate. For example, the inner surface of the structural housing 86 of the radiation detector 82 of FIG. 7 may be provided with a reflecting surface (diffuse or specular) to increase the number of photons received by the wavelength shifting light guide 88 from the conversion screen 84.

REFERENCES

[1] US 2009/0140150 (General Electric Company)
[2] U.S. Pat. No. 7,372,040 (Science Applications International Corporation)
[3] EP 1 749 220 (Symetrica Limited)
[4] EP 2 019 974 (Symetrica Limited)

[5] G F Knoll, Radiation Detection and Measurement, 3$^{rd}$ Edition, published by John Wiley & Sons Inc 2000. p 235
[6] E. S. Kuzrnin, A. M. Balagurov, G. D. Bokuchava et al. "Detector for the FSD Fourier-Diffractometer based on ZnS(Ag)/6LiF scintillation screen and wavelength shifting fibers readout" JINR E13-2001-204, Dubna, 2001.

The invention claimed is:

1. A radiation detector comprising:
a conversion screen comprising a mixture of a neutron absorbing material and a phosphor material,
a wavelength-shifting light-guide arranged to receive photons emitted from the phosphor material and generate wavelength-shifted photons therefrom, wherein the wavelength-shifting light-guide comprises a sheet of gamma-ray scintillator material operable to generate scintillation photons in response to a gamma-ray detection event therein, wherein the conversion screen and wavelength-shifting light-guide comprise different layers, and
a photodetector optically coupled to the wavelength-shifting light-guide and arranged to detect the wavelength-shifted photons and the scintillation photons, the radiation detector further comprising:
a processor arranged to receive a signal output from the photodetector and to process the signal to determine whether a radiation interaction has occurred in the detector, wherein the processor is operable to identify the occurrence of spikes in the signal by identifying changes in the signal larger than a spike threshold, to determine the number of spikes occurring in a time interval, to compare the number of spikes occurring in the time interval with a threshold number, and to determine whether the spikes are associated with one or more gamma-ray interactions in the wavelength-shifting light-guide or one or more neutron interactions in the conversion screen based on the result of the comparison.

2. A radiation detector according to claim 1, wherein the conversion screen comprises a substrate, and wherein the neutron absorbing material and the phosphor material are in a powdered form in a binding material on the substrate.

3. A radiation detector according claim 2, wherein the substrate is reflective for wavelengths in the region of the peak emission wavelength of the phosphor material.

4. A radiation detector according to claim 1, further comprising a second conversion screen disposed on an opposing side of the wavelength-shifting light-guide to the first-mentioned conversion screen such that the wavelength-shifting light-guide is arranged to also receive photons emitted from the second conversion screen as well as from the first-mentioned conversion screen, and to create wavelength-shifted photons therefrom.

5. A radiation detector according to claim 1, wherein the wavelength-shifting light-guide comprises a plastic sheet.

6. A radiation detector according to claim 1, further comprising a layer of neutron moderating material arranged to moderate neutrons prior to interaction in the conversion screen.

7. A radiation detector according to claim 1, wherein the conversion screen and wavelength-shifting light-guide are in the form of adjacent planar layers.

8. A radiation detector according to claim 1, wherein the conversion screen and/or the wavelength-shifting light-guide have a length selected from the group comprising at least 0.1 m, at least 0.2 m, at least 0.5 m, at least 1 m, at least 1.5 m, and at least 2.0 m.

9. A radiation detector according to claim 1, wherein the conversion screen and/or the wavelength-shifting light-guide has an extent in a first direction that is greater than its extent in two orthogonal directions by a factor selected from the group comprising at least 5, 6, 7, 8, 9 and 10 times.

10. A radiation detector according to claim 1, wherein the photodetector comprises a wideband amplifier.

11. A radiation detector according to claim 1, wherein the processor is operable such that
(i) if the number of spikes in the time interval is less than the threshold number the spikes are determined to be associated with gamma-ray interactions in the wavelength-shifting light-guide, and
(ii) if the number of spikes in the time interval is more than the threshold number the spikes are determined to be associated with a neutron interaction in the conversion screen.

12. A radiation detector according to claim 1, wherein the threshold number and/or the duration of the time interval is dependent on a number of gamma-ray interactions determined to have occurred in at least one previous time interval.

13. A radiation detector according to claim 12, wherein the threshold number and/or the duration of the time interval is dependent on a determined average number of gamma-ray interactions determined to have occurred in a number of previous time intervals.

14. A radiation detector according to claim 1, wherein the processor is further operable to provide an output signal indicative of the nature of radiation interactions determined to have occurred in the detector.

15. A method of detecting radiation comprising:
providing a conversion screen comprising a mixture of a neutron absorbing material and a phosphor material,
providing a wavelength-shifting light-guide arranged to receive photons emitted from the phosphor material and generate wavelength-shifted photons therefrom, wherein the wavelength-shifting light-guide comprises a sheet of gamma-ray scintillator material operable to generate scintillation photons in response to a gamma-ray detection event therein, wherein the conversion screen and wavelength-shifting light-guide comprise different layers,
detecting photons corresponding to the wavelength-shifted photons and/or the scintillation photons;
receiving a signal from detecting the photons;
processing the signal to determine whether a radiation interaction has occurred in the detector;
identifying the occurrence of spikes in the signal by identifying changes in the signal larger than a spike threshold;
determining the number of spikes occurring in a time interval;
comparing the number of spikes occurring in the time interval with a threshold number; and
determining whether the spikes are associated with one or more gamma-ray interaction in the wavelength-shifting light-guide or one or more neutron interactions in the conversion screen base on the result of the comparison.

* * * * *